United States Patent [19]

Parker et al.

[11] 3,978,156

[45] Aug. 31, 1976

[54] COLOR STABILIZED POLYURETHANES

[75] Inventors: Richard Ghrist Parker, Hudson; Philip Carlos Kelley, Brecksville, both of Ohio

[73] Assignee: The B. F. Goodrich Company, Akron, Ohio

[22] Filed: May 14, 1975

[21] Appl. No.: 577,332

[52] U.S. Cl. ............... 260/859 R; 260/45.8 NT; 260/45.9 NN; 526/312
[51] Int. Cl.² ........................................ C08L 75/04
[58] Field of Search... 260/859 R, 859 PV, 45.8 SN, 260/45.85 P, 45.85 R, 45.85 B, 45.85 T, 77.5 SS, 77.5 AM, 89.5 N, 89.5 S, 89.7 R, 45.8 NT

[56] References Cited
UNITED STATES PATENTS

| | | | |
|---|---|---|---|
| 3,305,533 | 2/1967 | Thoma | 260/77.5 AM |
| 3,432,456 | 3/1969 | Oertel | 260/77.5 AM |
| 3,554,962 | 1/1971 | Fischer | 260/45.85 B |
| 3,560,432 | 2/1971 | Briggs | 260/45.85 B |
| 3,630,987 | 12/1971 | Thoma | 260/77.5 AM |
| 3,640,937 | 2/1972 | Thoma | 260/77.5 AM |
| 3,644,482 | 2/1972 | Dexter | 260/45.85 B |
| 3,929,726 | 12/1975 | Schollenberger | 260/45.8 NT |

*Primary Examiner*—Paul R. Michl
*Attorney, Agent, or Firm*—J. Hughes Powell, Jr.

[57] ABSTRACT

Polyurethanes exposed to degradative atmospheric conditions, particularly ultraviolet light, have improved resistance to such degradation when the polyurethanes contain small amounts of polymeric hydrazide, a phenolic stabilizer and an ultraviolet absorber in combination.

11 Claims, No Drawings

COLOR STABILIZED POLYURETHANES

BACKGROUND OF THE INVENTION

Solid polyurethanes, both thermoplastic and elastomeric, find many applications because of their excellent physical properties including abrasion resistance. Such applications include, for example, films and coatings on fabric, metal, as films per se, and the like where they are often exposed to degradative effects of the atmosphere including ultraviolet light. For such applications where the polyurethane surface is exposed, polyurethane compositions having improved resistance to atmospheric degradation, particularly ultraviolet, are desirable.

U.S. Pat. No. 3,149,998 is directed to the stabilization of spandex fibers against acid fume discoloration by incorporating therein a hydrazide or carbazide containing the radical CH—NH—NH$_2$, these spandex fibers being particularly subject to attack and yellowing due to nitric fumes. These carbazides were added to the spandex fibers to decrease the discoloring because of nitrogen oxide fumes and chlorine.

SUMMARY OF THE INVENTION

Polyurethanes especially in film form, when exposed to the degradative atmosphere, particularly ultraviolet light, have resistance to such degradation when the polyurethane contains a combination of a polymeric hydrazide, a phenolic stabilizer and an ultraviolet absorber.

DETAILED DESCRIPTION

The polyurethanes are readily prepared from a variety of compounds having terminal functional groups reactive with organic diisocyanates. Normally used are hydroxyl-terminated compounds. The hydroxyl-terminated compounds or macroglycols usually have molecular weights greater than about 300 to 400. A great variety of such macroglycols have been prepared and proposed for commercial applications. The most commonly used macroglycols are hydroxyl-terminated polyesters, polyethers, polylactones and polybutadienes. In the preparation of one type of elastomeric film and sheet material such macroglycols, alone or in admixture, having molecular weights greater than about 400, and difunctional chain extenders such as glycols, are reacted with the organic diisocyanate. Useful materials are obtained by reacting the organic diisocyanate with a mixture of a macroglycol and a low molecular weight difunctional chain extender such as an alkylene glycol or ether glycol, a cycloaliphatic glycol, or an aromatic-aliphatic glycol; or the so-called prepolymer technique may be used where an excess of organic diisocyanate is first reacted with the macroglycol and then the low molecular weight difunctional chain extender added, normally in amounts equivalent to react with substantially all of the free isocyanate groups.

The hydroxyl polyester macroglycols are linear hydroxyl-terminated polyesters having molecular weights between about 500 and 4000 and acid numbers usually less than about 10. The polyesters utilized include those prepared by the polyesterification of aliphatic dicarboxylic acids including for example, adipic, succinic, pimelic, suberic, azelaic, sebacic and the like or their anhydrides. Aromatic dicarboxylic acids may also be used, or mixtures of aliphatic and aromatic dicarboxylic acids. Useful acids include aliphatic dicarboxylic acids of the formula HOOC—R—COOH where R is an alkylene radical containing 2 to 8 carbon atoms. The phthalic acids are also useful. The glycols used in the preparation of the polyesters by reaction with the dicarboxylic acids are aliphatic glycols containing between 2 and 10 carbon atoms such as ethylene glycol, propanediol, butanediol, hexamethylene glycol, octamethylene glycol, 2-ethyl-1,6-hexanediol, neopentyl glycol and the like. Preparation of the specific polyesterurethanes from polyesters are described in U.S. Pat. No. 2,871,218 for example. Polyesteramides also are contemplated, usually by substitution of a diamine or amino alcohol for at least part of the glycol.

Poly(epsilon-caprolactone)diol macroglycols are the polyester reaction products of epsilon-caprolactones whose polymerization has been initiated by bifunctional compounds having two active hydrogen sites which are capable of opening the lactone ring and initiating polymerization of the lactone. These bifunctional materials may be represented by the formula HX—R—XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane diol, 1,4-butanediol, hexamethylene glycol and the like. Ethylene glycol provides excellent polyesters.

The lactones preferred for preparing the polyesters are epsilon-caprolactones having the general formula

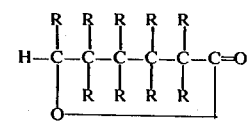

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethyl-epsilon-caprolactone, γ-methyl-epsilon-caprolactone, β-epsilon-caprolactone, dimethyl-epsilon-caprolactone and the like. The lactones are polymerized readily by heating with the bifunctional reactant to a temperature of about 100° to about 200°C. Catalysts may be employed if desired. Particularly preferred are poly(epsilon-caprolactone)-diols having molecular weights in the range of about 500 to about 5000.

The hydroxyl(polyalkylene oxide), or polyether, macroglycols preferably are essentially linear hydroxyl-terminated compounds having ether linkages as the major hetero-atom linkage joining carbon atoms. The molecular weights may vary between about 500 and 4000. The hydroxyl(polyalkylene oxide)s found useful include hydroxyl poly(methylene oxide)s such as hydroxyl poly(tetramethylene oxide), hydroxyl poly(-trimethylene oxide), hydroxyl poly(hexamethylene oxide), hydroxyl poly(ethylene oxide) and the like of the formula HO[(CH$_2$)$_n$O]$_x$H wherein n is a number from 2 to 6 and x is an integer, and alkyl substituted types such as hydroxyl poly(1,2-propylene oxide). Preparation of polyurethanes from such polyethers is described in U.S. Pat. No. 2,899,411 for example.

If low molecular weight glycols are used as chain extender with the macroglycols and the organic diisocyanate, these normally are aliphatic glycols or ether glycols containing 2 to 10 carbon atoms and include aromatic hydroxyls. Typical glycols which have been employed include ethylene glycol, propylene glycol, 1,4-butanediol, hexanediol, 2-ethyl-1,6-hexanediol, neopentyl glycol and the like. Cycloaliphatic glycols such as cyclohexanedimethanol, and aromatic-aliphatic glycols such as bis-1,4($\beta$-hydroxyethoxy)benzene, may also be employed.

The amount of glycol chain extender used with the macroglycol and the diisocyanate may vary from about 0.1 to 12 mols per mol of macroglycol. Excellent polyurethanes are obtained with a molar ratio of one mol of macroglycol and 1 to 5 mols of the small chain extender glycol. Substituted glycols also may be used.

The organic diisocyanates which are reacted with the macroglycols will include, for example, both aliphatic and aromatic diisocyanates. Such aliphatic diisocyanates include for example, hexamethylene diisocyanate, methylene-bis(4-cyclohexyl isocyanate), isophorone diisocyanate, etc. The aromatic diisocyanates include naphthalene-1,5-diisocyanate, diphenyl methane-4,4'-diisocyanate, tolylene diisocyanate, p-phenylene diisocyanate, dichlorodiphenyl methane diisocyanate, dimethyl diphenyl methane diisocyanate, bibenzyl diisocyanate, diphenyl ether diisocyanates, bitolylene diisocyanates and the like, for example, diisocyanates of the formula

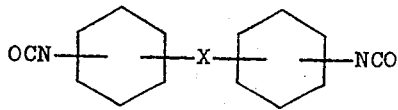

wherein X may be a valence bond, an alkylene radical containing 1 to 5 carbon atoms, NR (where R is an alkyl radical), oxygen, sulfur, sulfoxide, sulfone and the like. The stabilizing system of this invention is of particular utility in polyurethanes containing aromatic groups.

About equimolar ratios of diisocyanate and diols may be used. When a small glycol chain extender is also used, the ratio of reactants employed may be varied from about 1.5 to 13 mols of organic diisocyanate per mol of macroglycol with 0.5 to 12 mols of the glycol. The amounts of organic diisocyanate used is dependent on the total amount of glycol chain extender and macroglycol and normally is a molar amount essentially equivalent to the total of these latter two reactants so that there are essentially no free unreacted isocyanate groups remaining in the polymer. Excellent polyurethanes have been obtained when a molar ratio of one mol of macroglycol of molecular weight about 800 to 2500, 1 to 3 mols of glycol, and 2 to 4 mols of the aromatic diisocyanate are caused to react. While essentially equimolar amounts of isocyanate and active hydrogen groups are preferred, it will be understood that an excess or deficiency of any reactant, preferably less than 10%, as 5%, of excess or deficiency of organic diisocyanate can be used, although larger amounts of diisocyanate or less than a molar equivalent can, of course, be used in forming prepolymers.

Other polyurethane materials that are well known and prepared in a variety of ways as is described in the patent literature may be used. For example, hydroxyl-terminated polyesters, polyesteramides, polyalkylene ether glycols or lactones and the like of molecular weights from about 800 to 4000 or higher are reacted with organic isocyanates, generally with an excess of the diisocyanate. The resulting polyurethane elastomers may be cured or vulcanized by adding additional organic diisocyanate whereas only a slight excess of isocyanate is used to make the polyurethane; or if a substantial excess of organic diisocyanate is used in making the polyurethane, then the isocyanate-terminated polyurethane is mixed or treated or exposed to such amounts of polyfunctional additives such as water, diamines, glycols, and the like that will result in its curing or vulcanization. The excess diisocyanate present or added is in amounts from about 1 to 25%, preferably 3 to 15 weight parts per 100 weight parts of polyurethane. Regardless of the source of the polyurethane, the advantages of this invention are realized.

The poly(hydrazides) are prepared by reacting hydrazine with a poly(alkyl acrylate)s. Excellent results have been obtained with copolymers of alkyl acrylate and alkacrylate esters with other vinylidene monomers, unexpectedly better than homopolymers. The alkyl acrylates and methacrylates generally have the formula

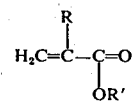

wherein R is hydrogen, methyl, ethyl, propyl or butyl, and R' is an aliphatic group containing 1 to 12 carbon atoms including for example, alkyl groups as methyl, ethyl, propyl, isopropyl, butyl, isobutyl, hexyl, 2-ethylhexyl, octyl, decyl, cyclohexyl and the like. Alkoxy acrylates are also contemplated including, for example, methoxy ethylacrylate, ethoxy methylacrylate, and the like. Of particular utility are methyl acrylate, ethyl acrylate, propyl acrylate, butyl acrylate, isoamyl acrylate, 2-ethylhexyl acrylate, octyl acrylate, dodecyl acrylate and decyl acrylate, methyl methacrylate, ethyl methacrylate, methyl ethacrylate, ethyl ethacrylate, halo-acrylates, cyano acrylates and the like. Copolymers of these alkyl acrylate esters with other vinylidene compounds containing at least one terminal $CH_2{<}$ group are readily used in preparing the polyhydrazides of this invention and are, in fact, preferred. Such copolymers contain at least one alkyl acrylate or alkyl alkacrylate and at least one vinylidene monomer, usually monoolefinic vinylidene monomers; including, for example, vinyl chloride, vinylidene chloride, styrene, acrylonitrile, methylvinyl ether, chloroethyl vinyl ether, methyl vinyl ketone, $\alpha$-methyl styrene, methacrylonitrile, vinyl acetate, vinyl butyrate, vinyl benzyl chloride, chloropropyl acrylate, acrylamide, methacrylamide, N-methylol acrylamide, and the like. Preferred are copolymers of styrene and lower alkyl acrylates or methyl and ethyl acrylate.

These copolymers will normally contain more than 10% of the acrylate and more preferably greater than 25% acrylate, with the remainder being other vinylidene monomers as defined. Useful materials contain, for example, from about 25 to 75 parts of styrene and about 75 to 25 parts of methyl acrylate or ethyl acrylate. The polymers and copolymers have molecular weights in the range greater than about 1000, as about 5,000 to 100,000 or greater. More preferably, the molecular weight is in the range of about 5,000 to about 100,000.

The preparation of the poly(hydrazides) from the acrylate ester polymer and copolymers is rather straightforward and the reaction is normally conducted in a solution or solvent system, preferably in a solvent that has some solubility for both the polymer and hydrazine hydrate. Polymers have been prepared in dimethyl sulfoxide as well as ethyl alcohol as the reaction medium to suspend the polymers since the hydrazine hydrate is soluble in the alcohol. For styrene and methyl acrylate 50/50 copolymers, reaction at about 24 hours in tetrahydrofuran at 80°C. with hydrazine hydrate provided a poly(hydrazide) containing 30% hydrazide. The course of conversion to hydrazide can be followed by infra-red analysis.

Another method for preparing the poly(hydrazides) is from acrylyl chloride (CH₂=CHCOCl) and methyl acrylyl chloride and other halide monomers thereof copolymerized with other vinylidene monomers as described above with the acrylate esters.

The hydrazines used for reaction with the polymers in accordance with this invention to provide the polymeric hydrazide may be selected from a great variety of hydrazine derivatives. Hydrazine itself in the form of hydrazine hydrate is very useful. Also useful are hydrazine derivatives such as methyl hydrazide, unsym-dimethyl hydrazine, and phenyl hydrazine, and organic hydrazides represented by the general formula RCONHNH₂ wherein R may be a great variety of radicals both acyclic, alicyclic, aromatic and heterocyclic. These hydrazine derivatives normally are reaction products of esters of carboxylic acids, acid chlorides and anhydrides. A useful group of hydrazides include those of the general formula C$_n$H$_{2n+1}$CONH₂ wherein $n$ is a number from 1 to 18, more preferably from 4 to 10. Examples of useful hydrazides include, for example, butyric acid hydrazide, acethydrazide, oxalyl dihydrazide, oxamidic hydrazide, ethylisobutylacethydrazide, and the like. Other useful hydrazides include aryl derivatives, for example, 3-(3,5-di-t-butyl-4-hydroxyphenyl)propionic acid hydrazide, benzoic acid hydrazide, p-methoxybenzoic acid hydrazide, p-ethoxybenzoic acid hydrazide, p-nitrophenyl acetylhydrazide, acetyl hydrazide, p-aminobenzoic acid hydrazide, benzenesulfonyl hydrazide, cyanoacetic acid hydrazide, cyclopropanecarboxylic acid hydrazide, 2-furoic acid hydrazide, glutaric dihydrazide, p-hydroxybenzoic acid hydrazide, 3-hydroxy-2-naphthoic acid hydrazide, indole-3-acetic acid hydrazide, isonicotinic acid hydrazide, nicotinic acid hydrazide, phenylacetic acid hydrazide, 2-thiophenecarboxylic acid hydrazide, p-toluenesulfonhydrazide, p-toluic acid hydrazide, and the like. Particularly useful are hydrazides of the general formula

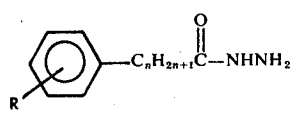

wherein $n$ is 1–18, R is alkyl, hydroxyl, or combinations thereof including specifically

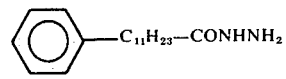

and

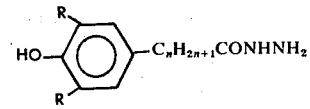

wherein $n$ is 1–4 and R is t-butyl.

The poly(hydrazide) structures are

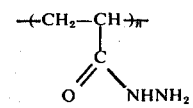

and

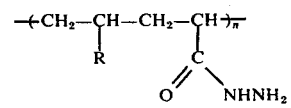

wherein $n$ is 50 – 1000.

These polymers can contain, based upon the amount of acrylate ester in the copolymer, an amount of hydrazide —CONHNH₂ equivalent up to, on a molar basis, the amount of acrylate. In copolymers containing, for example, 50% styrene, 50% methyl acrylate the amount of hydrazide present in the poly(hydrazide) preferably will be in the range of about 20 to about 40 weight percent but by further reaction or stopping the reaction as desired the amount may be as low as 5 to 10% and an amount approaching 50% on a molar basis.

The amount of poly(hydrazide) based on the —CONHNH₂ content used may be varied quite widely, for example, from about 0.01, usually about 0.1 to about 3 to 5 weight parts hydrazide per 100 weight parts of polyurethane.

The combinations of the poly(hydrazide), hydroxyl-containing aryl ultraviolet absorbers, and antioxidants provide outstanding resistance in some of the polymers. Typical of such materials are benzophenones including 2,4-dihydroxybenzophenone, 2,2'-dihydroxy-4,4'-dimethoxy benzophenone, 2-hydroxy-4-methoxy benzophenone, 2-hydroxy-4-n-heptoxy-benzophenone, 4-dodecyloxy-2-hydroxy-benzophenone, 5-chloro-2-hydroxy-benzophenone; substituted isocyanurates as hydroxyl phenyl substituted isocyanurates including tris-(3,5-di-t-butyl-4-hydroxybenzyl) isocyanurate and tris[3-(3,5-di-t-butyl-4-hydroxyphenyl)propionyloxyethyl]isocyanurate; benzotriazoles including 2(2'-hydroxy-5'-methylphenyl)benzotriazole, 2-(3',5'-di-t-butyl-2'-hydroxyphenyl)-5-chlorobenzotriazole and 2[2'-hydroxy-3',5'-di-(t-amyl)-phenyl]benzotriazole; benzylidene malonates; substituted acrylonitriles including ethyl-2-cyano-3,3-diphenyl acrylate; diethyl-3-acetyl-4-hydroxybenzyl phosphonate; pentaerythritol tetra-β-(4-hydroxy-3,5-di-t-butyl-phenyl)propionate; substituted triazines as hexahydro-1,3,5-tris-β-(3,5-di-t-butyl-4-hydroxyphenyl)propionyl-s-triazine and 2,4,6-tris(3,5-di-t-butyl-4-hydroxybenzylthio)-s-triazine, and the like in amounts of 0.01 to 3 to 5 weight parts. Particularly preferred are 2[2'-hydroxy-3',5'-di-(t-amyl)-phenyl]benzotriazole and pentaerythritol tetra-β-(4-hydroxy-3,5-di-t-butyl-phenyl)propionate in amounts of 0.2 to 2 weight parts of each.

These polyurethanes can also be mixed and compounded with standard compounding ingredients known to those skilled in the art including, for example, lubricants, fillers, colorants, plasticizers, pigments, processing aids, plasticizers, and the like, as well as other stabilizers and antioxidants.

EXAMPLE I

Preparation of Methyl Acrylate-Styrene Copolymers

In a 1000-ml three-necked round-bottomed flask equipped with stirrer, thermometer, and dry nitrogen sweep were placed methyl acrylate (x g), styrene 100-x g, tetrahydrofuran (400 ml), and azobisisobutyronitrile (1 g). The stirred solution was heated at reflux for 24 hours. The cooled solution (100 ml portion) was slowly poured into methanol (400 ml) being agitated in a blender. The resulting white precipitate was collected on a Büchner funnel, sucked dry, slurried with fresh methanol (to remove styrene), and vacuum-dried at 50°C. The amounts of monomers used and polymer molecular weight were as follows:

| Monomer | Amounts | Molecular Weight | |
|---|---|---|---|
| | | $M_n$ | $M_w$ |
| Methyl acrylate | 50 | 12,000 | 17,000 |
| Styrene | 50 | | |
| Methyl acrylate | 25 | 14,000 | 24,700 |
| Styrene | 75 | | |
| Methyl acrylate | 75 | 11,600 | 20,600 |
| Styrene | 25 | | |

The copolymers contain methyl acrylate and styrene in essentially the charge proportions.

EXAMPLE II

Preparation of Poly(hydrazides) from Methyl Acrylate-Styrene Copolymers

In a 500-ml three-necked round-bottomed flask equipped with a magnetic stirrer, condenser, and nitrogen sweep were placed the methyl acrylate-styrene copolymer (50.0 g), ethanol (200 ml), and 85% hydrazine hydrate (100 ml). The reaction mixture was stirred and heated at reflux for 48 hours. The cooled reaction mixture was poured slowly into distilled water (200 ml) being agitated in an air-driven blender. The white precipitate was collected on a Buchner funnel, sucked dry, and vacuum-dried at 50°C. This procedure yields a poly(hydrazide) containing 28% hydrazide, 22% methyl acrylate, and 50% styrene when starting with the 50/50 copolymer. The proportion of hydrazide can be increased by using longer reaction times. The reaction time can be halved by substituting dimethyl sulfoxide for ethanol but the recovery step takes more time.

EXAMPLE III

To demonstrate the effectiveness of the organic hydrazide in the practice of this invention a 15% solution in tetrahydrofuran was made of a polyesterurethane prepared by reacting one mol of a polytetramethylene adipate polyester of 1050 molecular weight, 1.0 mol of butanediol-1,4 and 2 mols of diphenylmethane diisocyanate. Each of the poly(hydrazides) tested was added to the polyurethane cement in an amount of one weight part hydrazide group per 100 weight parts based on the polyurethane. The resulting cement was spread on glass and dried at room temperatures to provide films about 3 mil thick. The film samples were removed from the glass and suspended with both sides exposed in 13 inch diameter aluminum cylinder containing four circular (12 inch diameter) fluorescent black light tubes. The screening used the highest light level which provides a temperature of 85°–90°C. in the sample chamber. The samples were exposed for 24 hours and observed each hour for the first 8 hours, then every 2 hours thereafter. Stabilizer effectiveness is judged by the time lapsed before development of yellow color. In Table I below appears results obtained with the poly(hydrazide) of the composition indicated and the pentaerythritol-tetra-β-(4-hydroxy-3,5-di-t-butyl phenyl) propionate (Irganox 1010) and 2[2'-hydroxy-3',5'-di-(t-amyl)-phenyl]benzotriazole (Tinuvin 328), with the effective life to first yellow indicated along with a control. The poly(hydrazides) were prepared in accordance with Example II from copolymers prepared in accordance with Example I.

TABLE I

| Additive | % Composition | | | Level[d] | Time[e] |
|---|---|---|---|---|---|
| | H[a] | MA[b] | S[c] | (phr) | (hr.) |
| Irganox 1010 | | | | 1 | |
| Tinuvin 328 | | | | 1 | 9 |
| Poly(hydrazides)[f] | 25–35 | 10–24 | 50–65 | 1 | 2 |
| PH-1 | 25 | 10 | 65 | | |
| Irganox 1010 | | | | 1 | |
| Tinuvin 328 | | | | 1 | 22 |
| PH-2 | 35 | 15 | 50 | 1 | |
| Irganox 1010 | | | | 1 | |
| Tinuvin 328 | | | | 1 | 22 |
| PH-3 | 26 | 24 | 50 | 1 | |
| Irganox 1010 | | | | 1 | |
| Tinuvin 328 | | | | 1 | 22 |
| PH-4 | 32 | 18 | 50 | 1 | |
| Irganox 1010 | | | | 1 | |
| Tinuvin 328 | | | | 1 | 16 |
| PH-5 | 27 | 23 | 50 | 1 | |
| Irganox 1010 | | | | 1 | |
| Tinuvin | | | | 1 | 16 |
| Benzoic Acid Hydrazide | | | | | |
| Irganox 1010 | | | | 1 | 9 |

TABLE I-continued

| Additive | % Composition | | | Level[d] (phr) | Time[e] (hr.) |
|---|---|---|---|---|---|
| | H[a] | MA[b] | S[c] | | |
| Tinuvin | | | | 1 | |

[a]Hydrazide (—CONHNH$_2$)
[b]Methyl acrylate
[c]Styrene
[d]phr based on polyurethane
[e]time to yellow
[f]each of the poly(hydrazides) (PH) failed in less than 2 hrs.

In this test, Irganox and Tinuvin at 1 phr each, all of the poly(hydrazides) alone at 1 phr (0.25–0.35 phr of CONHNH$_2$), and a combination of benzoid acid hydrazide, Irganox and Tinuvin all at 1 phr failed between 2 and 9 hours. In contrast, with 1 part of poly(hydrazide) (0.25–0.35 phr of CONHNH$_2$) with Irganox and Tinuvin, protection was obtained approaching 24 hours, thus demonstrating the powerful synergistic effect of the poly(hydrazide) with Tinuvin and Irganox. The best example demonstrates the superiority of the polymeric hydrazides compared to a simple hydrazide as benzoic acid hydrazide. The poly(hydrazide) PH-1 contains units of the structure

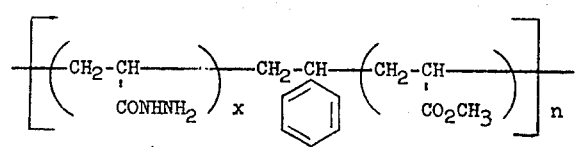

wherein $n$ is 100–200.

Another method for preparing the poly(hydrazide) is the copolymerization of acrylyl chloride with styrene and this reaction is a preferred route for making N-substituted poly(hydrazide) —CONHNHR. For example, N-substituted poly(hydrazides) are readily prepared using 3-(3,5-di-t-butyl-4-hydroxyphenyl)propionic acid hydrazide. One is readily prepared from the reaction of acrylyl chloride-styrene polymer and another from poly(acrylyl chloride). These copolymers were prepared in the same manner as the methyl acrylate-styrene copolymers.

EXAMPLE IV

Preparation of Poly(hydrazides) and Poly(N-substituted hydrazides) from Acrylyl Chloride-Styrene Copolymers In a 250-ml Erlenmeyer flask equipped with a magnetic stirrer and nitrogen sweep were placed 95% hydrazine (1.32 g) or 3-(3,5-di-t-butyl-4-hydroxyphenyl)-propionic acid hydrazide (11.4 g), anhydrous sodium bicarbonate (3.28 g), and tetrahydrofuran (50 ml). To this stirred mixture was added, at a moderate rate, a tetrahydrofuran solution of acrylyl chloride-styrene copolymer taken directly from a copolymerization prepared in the same manner of methyl acrylate-styrene. The reaction is stirred at room temperature for one hour and then slowly poured into aqueous methanol (200 ml) being agitated in an air-driven blender. The precipitate is collected on a Buchner funnel, sucked dry, and vacuum dried at 50°C.

The copolymer derivative of acrylyl chloride and styrene shows excellent results. 0.5 phr of the poly(N-substituted hydrazide) with 1 phr of Tinuvin and 0.5 phr Irganox protected the polyesterurethane for 24 hours in the yellowness test when tested as described in Example III.

We claim:

1. A polyurethane composition containing stabilizing amounts of a polymeric hydrazide of a polymer of an alkyl acrylate having the general formula

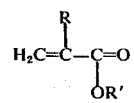

wherein R is hydrogen or alkyl containing 1 to 4 carbon atoms and R' is an alicyclic group containing 1 to 12 carbon atoms, a phenolic stabilizer and an ultraviolet absorber.

2. A polyurethane of claim 1 wherein the poly(hydrazide) is a hydrazide of a polymer of an alkyl acrylate having the general formula

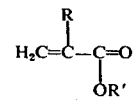

wherein R is hydrogen or alkyl containing 1 to 4 carbon atoms and R' is an alicyclic group containing 1 to 12 carbon atoms, containing at least 10 weight percent —CONHNH$_2$ groups, phenolic stabilizer is a phenolic benzotriazole and a pentaerythritol tetrapropionate ultraviolet absorber.

3. A polyurethane composition of claim 2 wherein the alkyl acrylate polymer is a copolymer of an alkyl acrylate ester wherein the alkyl group contains 1 to 6 carbon atoms copolymerized with at least about 10 weight percent of another vinylidene monomer containing at least one terminal CH$_2$ group and said polyurethane contains polyhydrazide in amount to contain at least about 0.1 weight percent —CONHNH$_2$ group, at least about 0.1 weight percent to about 5 weight percent of said benzotriazole and propionate.

4. A composition of claim 3 wherein said acrylate ester copolymer is a copolymer of alkyl acrylate and styrene containing greater than about 20 weight percent hydrazide groups, said hydrazide, benzotriazole and propionate being present in amounts of at least about 0.25 weight percent, up to about 5 weight percent of the polyurethane.

5. A composition of claim 4 wherein said benzotriazole is 2[2'-hydroxy-3',5'-di(t-amyl)-phenyl]benzotriazole and said propionate is pentaerythritol-tetra-β-(4-hydroxy-3,5-di-t-butylphenyl)propionate present in amounts of about 0.5 to about 3 weight percent.

6. A composition of claim 2 wherein said polymer contains greater than about 40% alkyl acrylate ester and the copolymer has a molecular weight in the range of about 5,000 to about 100,000.

7. A composition of claim 6 wherein the acrylate ester polymer is a copolymer of ethyl acrylate or methyl acrylate and styrene in amounts of about 25 to 75 to 75 to 25 weight parts of each and the hydrazide content is from about 20 to 50 weight percent.

8. A composition of claim 1 wherein the poly(hydrazide) is a hydrazide of a copolymer of acrylyl chloride or methyl acrylyl chloride copolymerized with at least one other vinylidene monomer containing at least one terminal $CH_2{<}$ group.

9. A stabilizing composition comprising a poly(hydrazide) of a polymer of an alkyl acrylate having the general formula

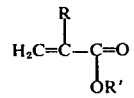

wherein R is hydrogen or alkyl containing 1 to 4 carbon atoms and R' is an alicyclic group containing 1 to 12 carbon atoms, a phenolic stabilizer and an ultraviolet absorber.

10. A composition of claim 9 wherein the poly(hydrazide) is a hydrazide of a copolymer of styrene and methyl acrylate, the stabilizer is 2[2'-hydroxy-3',5'-di(t-amyl)-phenyl]benzotriazole and the ultraviolet absorber is pentaerythritol-tetra-β-(4-hydroxy-3,5-di-t-butylphenyl)-propionate.

11. A composition of claim 9 wherein the poly-(hydrazide) is a hydrazide of a copolymer of styrene and methyl acrylate and 3-(3,5-di-t-butyl-4-hydroxyphenyl)-propionic acid hydrazide.

* * * * *

UNITED STATES PATENT AND TRADEMARK OFFICE
CERTIFICATE OF CORRECTION

PATENT NO. : 3,978,156
DATED : August 31, 1976
INVENTOR(S) : RICHARD GHRIST PARKER and PHILIP CARLOS KELLEY It is certified that error appears in the above-identified patent and that said Letters Patent are hereby corrected as shown below:

In Column 10, line 55 after $CH_2$ insert: $\langle$

Signed and Sealed this

Eighteenth Day of April 1978

[SEAL]

Attest:

RUTH C. MASON
Attesting Officer

LUTRELLE F. PARKER
Acting Commissioner of Patents and Trademarks